(12) United States Patent
De Laet et al.

(10) Patent No.: US 11,754,168 B2
(45) Date of Patent: Sep. 12, 2023

(54) OIL DRAINAGE

(71) Applicants: ZF Friedrichshafen AG, Friedrichshafen (DE); ZF Wind Power Antwerpen N.V., Lommel (BE)

(72) Inventors: Wim De Laet, Antwerp (BE); Stijn Rottiers, Lokeren (BE); Kris Adriaensen, Friedrichshafen (DE); Richard Cordes, Friedrichshafen (DE)

(73) Assignees: ZF FRIEDRICHSHAFEN AG, Friedrichshafen (DE); ZF WIND POWER ANTWERPEN N.V., Lommel (BE)

( * ) Notice: Subject to any disclaimer, the term of this patent is extended or adjusted under 35 U.S.C. 154(b) by 145 days.

(21) Appl. No.: 17/297,485

(22) PCT Filed: Oct. 24, 2019

(86) PCT No.: PCT/EP2019/079003
§ 371 (c)(1),
(2) Date: May 27, 2021

(87) PCT Pub. No.: WO2020/108889
PCT Pub. Date: Jun. 4, 2020

(65) Prior Publication Data
US 2022/0025966 A1   Jan. 27, 2022

(30) Foreign Application Priority Data

Nov. 29, 2018   (DE) .................. 10 2018 220 534.5

(51) Int. Cl.
*F16H 57/04*   (2010.01)
*F16L 27/12*   (2006.01)

(52) U.S. Cl.
CPC ..... *F16H 57/0408* (2013.01); *F16H 57/0423* (2013.01); *F16L 27/12* (2013.01)

(58) Field of Classification Search
CPC ............. F16H 57/0408; F16H 57/0423; F16H 57/0445; F16L 27/12
See application file for complete search history.

(56) References Cited

U.S. PATENT DOCUMENTS

| 3,399,548 | A | * | 9/1968 | Burns | E21B 17/07 285/302 |
| 4,776,617 | A |   | 10/1988 | Sato |  |
| 4,932,686 | A | * | 6/1990 | Anderson, Jr. | F16L 27/12 285/302 |
| 6,056,329 | A | * | 5/2000 | Kitani | F16L 27/12 285/302 |

(Continued)

FOREIGN PATENT DOCUMENTS

| CN | 203272030 U | 11/2013 |
| CN | 205155382 U | 4/2016 |

(Continued)

*Primary Examiner* — Minh Truong
(74) *Attorney, Agent, or Firm* — LEYDIG, VOIT & MAYER, LTD.

(57) ABSTRACT

An arrangement including a transmission housing forming a lubricant sump and a pipeline including a first piece and a second piece. The first piece and the second piece of the pipeline respectively open into the lubricant sump. The first piece and the second piece of the pipeline are inserted into one another.

11 Claims, 2 Drawing Sheets

(56) References Cited

U.S. PATENT DOCUMENTS

| | | | |
|---|---|---|---|
| 6,082,416 A | 7/2000 | Viken | |
| 8,764,066 B1* | 7/2014 | Rice | F16L 27/12 |
| | | | 285/302 |
| 2002/0194952 A1 | 12/2002 | Seemann | |
| 2010/0032937 A1 | 2/2010 | Kerin et al. | |
| 2016/0090967 A1 | 3/2016 | Boland et al. | |

FOREIGN PATENT DOCUMENTS

| | | |
|---|---|---|
| DE | 10254551 B3 | 4/2004 |
| DE | 102009036526 A1 | 2/2010 |
| EP | 3001070 A1 | 3/2016 |
| JP | 2001227623 A | 8/2001 |
| KR | 20150143953 A | 12/2015 |
| KR | 101714313 B1 | 3/2017 |
| WO | WO 2011080717 A2 | 7/2011 |

* cited by examiner

OIL DRAINAGE

CROSS REFERENCE TO RELATED APPLICATIONS

This application is a U.S. National Phase application under 35 U.S.C. § 371 of International Application No. PCT/EP2019/079003 (WO 2020/108889 A1), filed on Oct. 24, 2019, and claims benefit to German Patent Application No. DE 10 2018 220 534.5, filed on Nov. 29, 2018.

FIELD

The disclosure relates to an arrangement comprising a transmission housing and a pipeline, the transmission housing forming a lubricant sump, and the pipeline having a first piece and a second piece that respectively open into the lubricant sump.

BACKGROUND

Wind power transmissions often consist of three gear stages: a driven, input-side planetary stage, an intermediate planetary stage, and a downstream, output-side spur gear stage. Since the driven planetary stage is dimensioned to be larger than the intermediate planetary stage, the part of the housing surrounding the driven planetary stage must be dimensioned to be larger than the part of the housing surrounding the intermediate planetary stage.

In normal operation, the level of an oil sump located in the housing is above the lower edge of the housing part surrounding the intermediate planetary stage. As a result, a common oil sump extends between all three gear stages. However, if the oil is however drained, the level falls below the lower edge of the housing part surrounding the intermediate planetary stage. This has the result that separate oil sumps arise in the housing part surrounding the driven planetary stage and in the housing part surrounding the spur gear stage. In order to be able to empty them via a single drain, a drain pipe extends at the base of the transmission and connects the housing part surrounding the driven planetary stage and the housing part surrounding the spur gear stage to one another in a lubricant-conducting manner.

In order to compensate for manufacturing tolerances and load-related deformations of the transmission, the drain pipe must be flexible. Solutions that provide a flexible pipe section for this purpose are known from the prior art. However, such solutions have a number of disadvantages. For example, flexible pipe sections are susceptible to defects and leakages due to their low mechanical load-bearing capacity. In particular, there is the risk that a flexible pipe section twists during installation. Since these are seldom used parts that have to be specially produced, the costs are correspondingly high.

SUMMARY

In an embodiment, the present disclosure provides an arrangement including a transmission housing forming a lubricant sump and a pipeline including a first piece and a second piece. The first piece and the second piece of the pipeline respectively open into the lubricant sump. The first piece and the second piece of the pipeline are inserted into one another.

BRIEF DESCRIPTION OF THE DRAWINGS

Subject matter of the present disclosure will be described in even greater detail below based on the exemplary figures. The invention defined by the following claims is not limited to the exemplary embodiments. All features described and/or illustrated herein can be used alone or combined in different combinations. The features and advantages of various embodiments will become apparent by reading the following detailed description with reference to the attached drawings, which illustrate the following:

DETAILED DESCRIPTION

Figure 1:
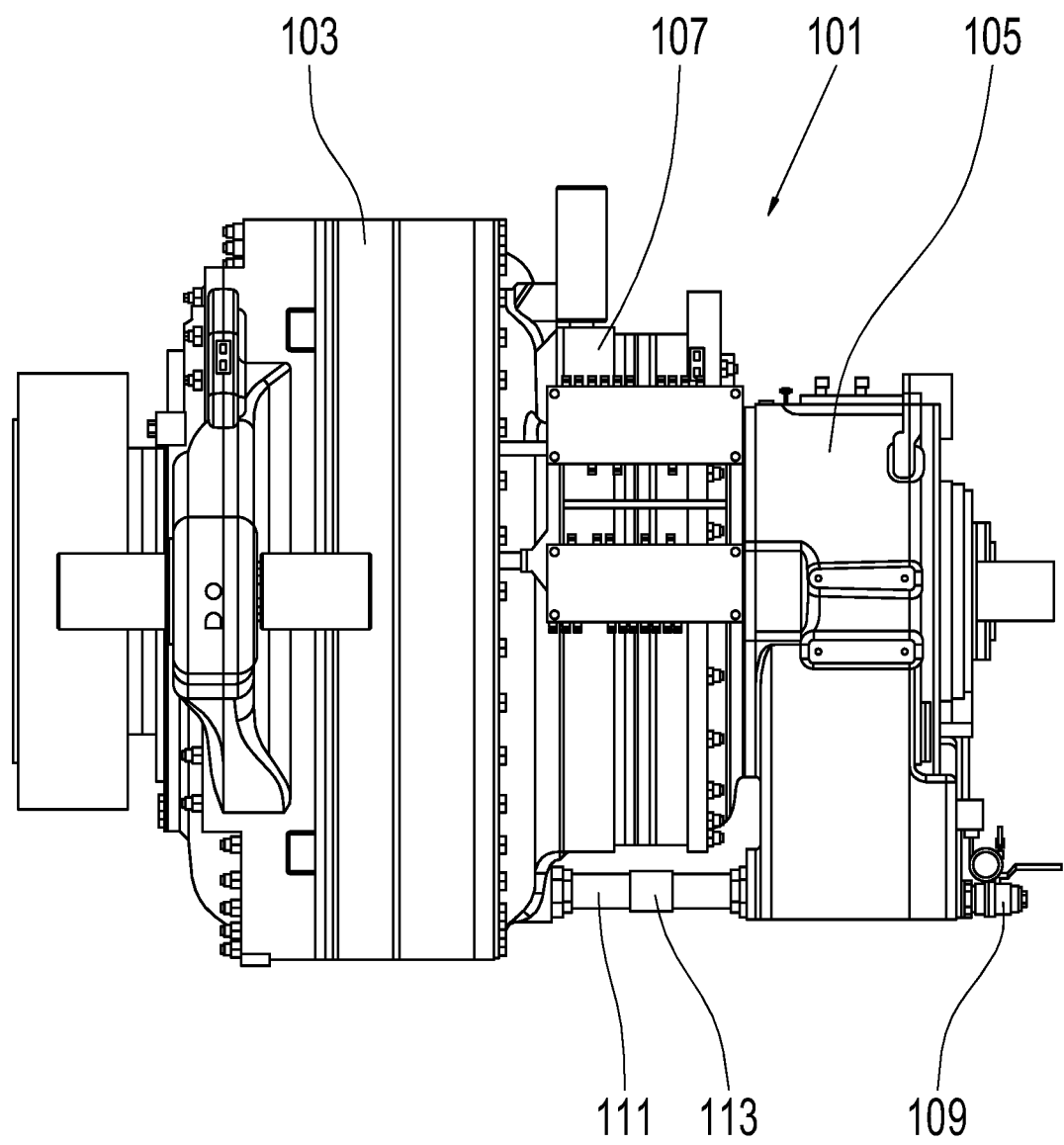
FIG. 1 a view of a transmission housing from outside.

The present disclosure provide a drain pipe that does not have the disadvantages inherent in the solutions known from the prior art. In particular, the present disclosure provides a mechanically robust, cost-effective and easy to install drain pipe.

The present disclosure provides an arrangement that includes a transmission housing and a pipeline. The pipeline is a conduit designed as a pipe. It is a fluid-conducting connection that is formed from one or more pipe pieces. In the present case, the pipeline is liquid-conducting, in particular lubricant-conducting.

The transmission housing forms an oil sump. The oil sump is a trough-shaped section of the transmission housing that is designed to collect lubricant and store it temporarily until it is reintroduced into the lubricant circuit.

A first piece of the pipeline and a second piece of the pipeline respectively open into the oil sump. The pipeline thus forms a lubricant-conducting connection between a first outlet into the oil sump and a second outlet into the oil sump.

The first piece and the second piece respectively form a pipeline. The first piece and the second piece are inserted into one another. The first piece was at least partially inserted into the second piece, or the second piece was at least partially inserted into the first piece. Consequently, at least a part of the second piece surrounds at least a part of the first piece in the circumferential direction with respect to a central axis of the pipeline.

In the inserted state, the first piece and the second piece form the pipeline of the arrangement. Accordingly, the first piece and the second piece are sealed against one another in a fluid-tight manner.

Since the first piece and the second piece are inserted into one another, they can be moved relative to one another. This makes it possible to compensate for any deviations due to manufacturing tolerances and load-related deformations of the transmission housing. The union connection between the first piece and the second piece can very simply be designed geometrically. Cast parts that are easy to manufacture and robust can therefore be used.

In a preferred development, the union connection consisting of the inner part and the outer part is axially displaceable between the first piece and the second piece along the central axis. This means that the first piece and the second piece are displaceable relative to one another along the central axis.

The central axis indicates the course of the pipeline. It is a curve, the geometric centroids are formed by cross-sectional areas of the pipeline. Each centroid of a cross-sectional area of the pipeline is part of the central axis. Lubricant that flows through the pipeline flows along the central axis.

The displaceability according to the development along the central axis is advantageous, since it makes possible a particularly simple construction of the union connection. This is utilized by a preferred development that provides at least one seal that seals the first piece and the second piece in a fluid-tight manner against one another. The seal is fixed non-displaceably in the first piece, e.g., in a groove formed by the first piece. The second piece forms a cylindrical section. The seal rests thereon. Conversely, the seal can be fixed non-displaceably in the second piece and rest on a cylindrical section of the first piece. The seal is annular. It therefore extends around the central axis and is closed in itself. It seals the first piece and the second piece against one another in a fluid-tight manner. Since it only rests on one of the two pieces, it is displaceable along the central axis. The twisting of the first piece and of the second piece around the central axis is permitted by the seal without restriction. Tilting about axes extending orthogonally thereto is also possible to a small extent.

In a preferred development, the transmission housing has at least two housing parts. Such parts are designed to be separate; i.e., they are not integrally connected to one another. They are joined together, preferably detachably, and thus encapsulate a cavity within the transmission housing— the transmission interior. The gears and bearings of the transmission are located in the transmission interior. They are lubricated via the lubricant circuit mentioned.

A first one of the housing parts has the first outlet of the pipeline into the oil sump; a second one of the housing parts has the second outlet of the pipeline into the oil sump. The first piece of the pipeline thus opens into the first housing part; the second piece opens into the second housing part. This implies that the two housing parts respectively form a part of the lubricant sump. According to the development, the pipeline forms a lubricant-conducting connection between the part of the oil sump formed by the first housing part and the part of the oil sump formed by the second housing part.

The first piece of the pipeline and the first housing part may be designed as separate parts or integrally connected to one another. The second piece of the pipeline and the second housing part may likewise be designed as separate parts or integrally connected to one another.

The transmission housing is preferably developed with a third housing part. The third housing part connects the first housing part and the second housing part to one another. This implies that the third housing part is arranged between the first housing part and the second housing part. The third housing part is joined to the first housing part on one side and to the second housing part on the other side. Together, the first housing part, the second housing part and the third housing part encapsulate the housing interior.

The first housing part may contain, for example, an input-side planetary stage, the second housing part an output-side spur gear stage, and the third housing part an intermediate planetary stage. As a result of a corresponding dimensioning of the third housing part, it may happen that the part of the lubricant sump formed by the first housing part and the part of the lubricant sump formed by the second housing part are no longer connected in a lubricant-conducting manner via the third housing part at a low level of lubricant. In this case, the pipeline serves as a bypass that "short-circuits" the first housing part and the second housing part and, instead of the third housing part, connects them in a lubricant-conducting manner.

A transmission 101 according to FIG. 1 has a first housing part 103, a second housing part 105 and a third housing part 107. The first housing part 103 and the third housing part 107 respectively enclose a planetary stage. A spur gear stage of the transmission 101 is located in the second housing part 105.

The second housing part 105 has a drain tap 109 for transmission oil. The drain tap 109 is located at the lowest point of the transmission 101. It serves to drain transmission oil from the transmission housing 101.

The third housing part 107 is arranged between the first housing part 103 and the second housing part 105. It is dimensioned to be smaller than the first housing part 103 and the second housing part 105. In particular, the first housing part 103 and the second housing part 105 project vertically downward beyond the third housing part 107. A lower end of the first housing part 103 and a lower end of the second housing part 105 are thus located vertically below a lower end of the second housing part 105.

If a level of an oil sump formed by the transmission housing 101 falls below the lower end of the second housing part 107, no lubricant-conducting connection exists via the second housing part 107 between a part of the oil sump formed by the first housing part 103 and a part of the oil sump formed by the second housing part 105. A pipeline 111 is therefore provided, which connects these parts of the oil sump in a lubricant-conducting manner.

The pipeline 111 is arranged at the base of the transmission 101 or of the transmission housing 103, 105, 107. It extends between the first housing part 103 and the second housing part 105 and thus bridges the third housing part 107. Oil that collects in the first housing part 103 when the oil is drained passes via the pipeline 111 into the second housing part 105 and can be removed from there from the transmission 101 via the drain tap 109.

The pipeline 111 shown in FIG. 1 has a flexible segment 113 known from the prior art. An alternative according to the present disclosure is shown in FIG. 2.

Figure 2:
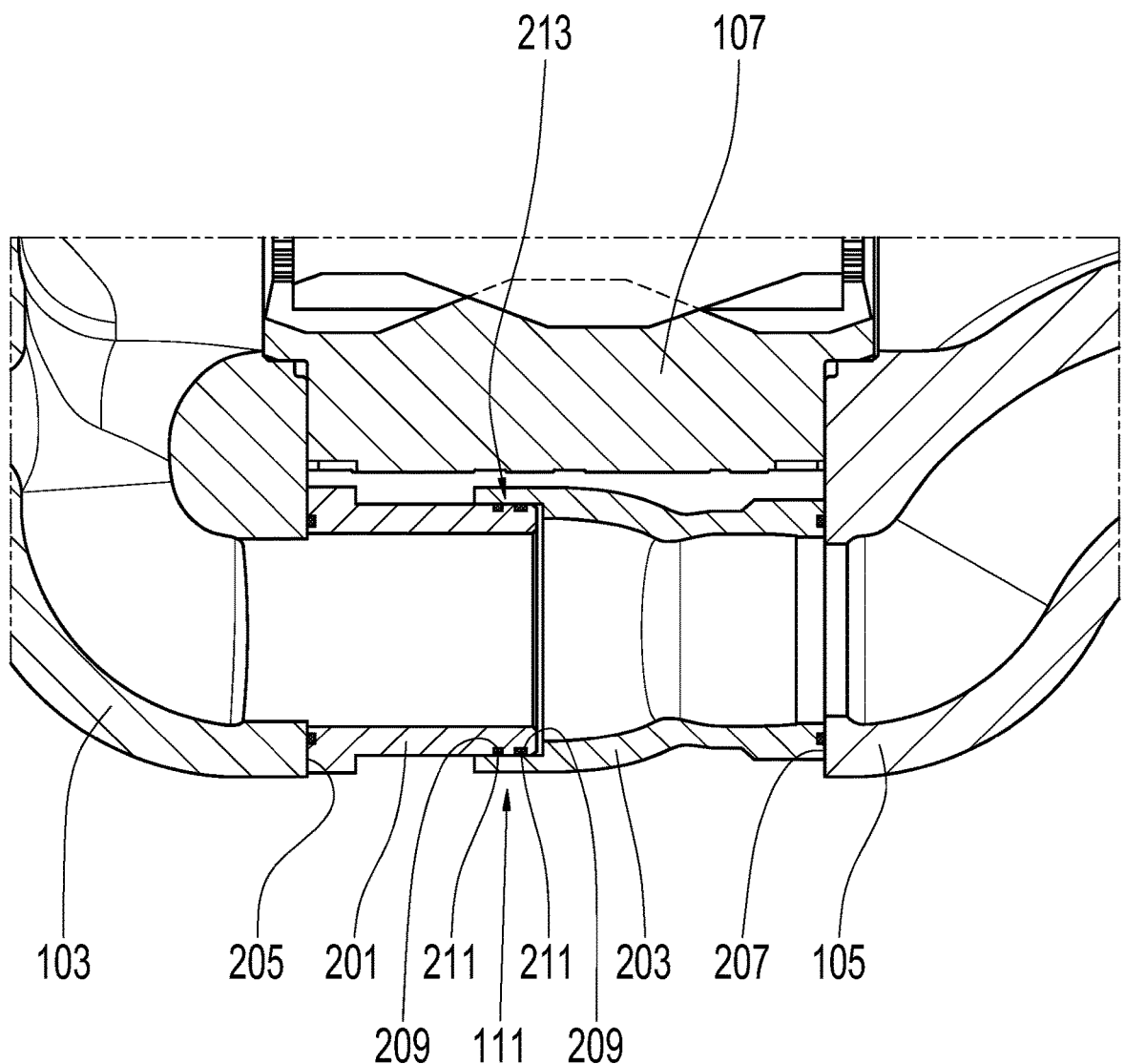
FIG. 2 a detailed view in longitudinal section.

According to FIG. 2, the pipeline 111 is formed by a first segment 201 and a second segment 203. The first segment 201 is screwed to the first housing part 103 via a first flange connection 205. Correspondingly, the second pipe piece 203 is screwed to the second housing part 105 via a second flange connection 207.

The first segment 201 has two grooves 209 into each of which a seal 211 is inserted. The grooves 209 and seals 211 extend rotationally symmetrically about the central axis. Accordingly, the first segment 201 is rotationally symmetrical in this region.

The rotationally symmetrical region of the first segment 201 is inserted with the grooves 209 and the seals 211 into a cylindrical region 213 of the second pipe piece 203. The cylindrical region 213 has the shape of a lateral surface of a right circular cylinder. The seals 211 bear on the cylindrical region 213 in an oil-tight manner.

Within the cylindrical region 213, the seals 211 are displaceable along the central axis of the pipeline 111. Accordingly, the first pipe piece 201 and the second pipe piece 203 can be displaced relative to one another. In doing so, the sealing effect of the seals 211 is maintained. This makes it possible to compensate for deviations 101 and load-related deformations of the transmission housing.

While subject matter of the present disclosure has been illustrated and described in detail in the drawings and foregoing description, such illustration and description are to be considered illustrative or exemplary and not restrictive. It will be understood that changes and modifications may be made by those of ordinary skill within the scope of the following claims. In particular, the invention defined by the following claims may cover further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

101 Transmission housing
103 First housing part
105 Second housing part
107 Third housing part
109 Drain tap
111 Pipeline
113 Flexible segment
201 First segment
203 Second segment
205 First flange connection
207 Second flange connection
209 Groove
211 Seal
213 Cylindrical region

The invention claimed is:

1. An arrangement, comprising:
a transmission housing forming a lubricant sump, and
a pipeline including a first piece and a second piece,
wherein the first piece and the second piece of the pipeline respectively open into the lubricant sump,
wherein the first piece and the second piece are inserted into one another,
wherein the transmission housing includes at least two separate housing parts,
wherein the first piece of the pipeline opens into a first one of the housing parts and the second piece of the pipeline opens into a second one of the housing parts,
wherein the first one of the housing parts comprises a curved elbow connecting the first piece of the pipeline to an input-side planetary stage of a transmission, and
wherein the second one of the housing parts comprises an s-bend connecting the second piece of the pipeline to an output-side spur gear stage of the transmission.

2. The arrangement according to claim 1, wherein the first piece and the second piece are displaceable relative to one another along a central axis.

3. The arrangement according to claim 2, further comprising at least one seal that seals the first piece and the second piece in a fluid-tight manner against one another,
wherein the seal is fixed non-displaceably in the first piece,
wherein the second piece forms a cylindrical region, and
wherein the seal bears against the cylindrical region.

4. The arrangement according to claim 3, wherein the at least one seal comprises two seals arranged in parallel and adjacent to one another.

5. The arrangement according to claim 4, wherein one of the first piece and the second piece includes two parallel and adjacent circumferential grooves, and wherein each of the two seals are arranged in one of the grooves.

6. The arrangement according to claim 5, wherein the two seals and the two grooves are configured to be inserted into a cylindrical region of the second piece of the pipeline, the cylindrical region having a shape corresponding to a lateral surface of a right circular cylinder.

7. The arrangement according to claim 6, wherein the two seals are configured to bear on the cylindrical region in an oil-tight manner.

8. The arrangement according to claim 1, further comprising a third housing part that connects the at least two housing parts to one another.

9. The arrangement according to claim 8, wherein the pipeline extends below the third housing part.

10. The arrangement according to claim 1, wherein the first piece of the pipeline is screwed to the first one of the housing parts via a first flange connection and the second piece of the pipeline is screwed to the second one of the housing parts via a second flange connection.

11. The arrangement according to claim 1, wherein the curved elbow is a 90 degree elbow.

* * * * *